United States Patent [19]
Takeyasu

[11] 3,987,583
[45] Oct. 26, 1976

[54] APPARATUS AND METHOD FOR PREVENTING PREMATURE SEPARATION OF SEPALS OF FLOWER BUDS

[76] Inventor: George S. Takeyasu, 1750 Hecker Pass Highway, Gilroy, Calif. 95020

[22] Filed: Sept. 17, 1975

[21] Appl. No.: 614,011

[52] U.S. Cl. ........................... 47/29; 47/26; 47/55; 206/423; 2/21
[51] Int. Cl.² ..................................... A01G 13/04
[58] Field of Search .............. 294/25; 2/21; 47/55, 47/41, 26–31, 3, 23, 58, 34.11; 206/423; 229/87 F, 4.5, 1.5 R, 1.5 B; 128/157

[56] References Cited
UNITED STATES PATENTS

| | | | |
|---|---|---|---|
| 203,898 | 5/1878 | Doak | 47/23 |
| 831,086 | 9/1906 | Maxfield | 47/55 |
| 1,304,410 | 5/1919 | Thornton | 229/87 F |
| 1,434,160 | 10/1922 | Slade | 47/28 |
| 1,964,238 | 6/1934 | Wood | 229/87 F X |
| 2,056,514 | 10/1936 | Garcia | 47/26 |
| 2,796,067 | 6/1957 | McCutcheon et al. | 229/1.5 B X |
| 3,271,922 | 9/1966 | Wallerstein et al. | 206/423 X |
| 3,376,666 | 4/1968 | Leonard | 47/41 |
| 3,422,570 | 1/1969 | Vorst et al. | 47/55 |

FOREIGN PATENTS OR APPLICATIONS

| | | | |
|---|---|---|---|
| 13,751 | 1899 | United Kingdom | 47/26 |

*Primary Examiner*—Robert E. Bagwill
*Attorney, Agent, or Firm*—Huebner & Worrel

[57] ABSTRACT

An apparatus and method for minimizing calyx rupture incident to rapid expansion of a corolla therein consisting of a hollow cone of lightweight light transmitting sheet material having ventilation openings therein which, as a flower bud starts to mature, is rested downwardly over the bud to circumscribe and lightly to constrain its calyx until the extended ends of the sepals of the calyx start to open to emit the corolla and is thereupon removed to release the calyx for uniform flowering of the corolla.

11 Claims, 10 Drawing Figures

APPARATUS AND METHOD FOR PREVENTING PREMATURE SEPARATION OF SEPALS OF FLOWER BUDS

BACKGROUND OF THE INVENTION

1. Field of the Invention

The present invention pertains generally to the field of horticultural apparatus and methods and more particularly to a new and useful apparatus and method for preventing premature and/or uneven separation of the sepals of floral buds.

2. Description of the Prior Art

At the bud stage in the development of a flower, the floral petals form an internal envelope called a "corolla" inside a covering called a "calyx" having several leaves called "sepals". A growing corolla exerts pressure on the calyx internally causing it to expand as it grows until the sepals separate at the top of the calyx as the individual petals emerge and unfold from the top of the bud.

Under certain conditions, particularly sudden temperature and humidity changes, a corolla is stimulated into an uneven or excessive rate of growth and may exert enough internal pressure to rupture the calyx sidewall by either splitting or separating adjacent sepals. Petals from the corolla then start growing out through the calyx sidewall. This results in a cull which usually cannot be sold.

Florists generally, and growers producing carnations in hot houses in particular, have long recognized this problem and have adopted a number of expedients to minimize the problem with indifferent success or with excessive labor and equipment costs.

One procedure has been to wrap paper-covered wire bands or ties around the buds and to twist the ties to reinforce the calyx. When the bands are too tight, they interfere with normal bud growth. Bands which are too loose do not prevent sepal separation. Further, the labor required to install the bands and then remove them before the flowers are harvested is excessive.

Another expedient is to wrap an adhesive-coated cellophane band or tape around the bud. Such bands can usually be installed with the appropriate tension but the labor cost of installation is excessive, the bands are removed with considerable difficulty and frequently damage the buds while being removed and the bands are not re-usable. The magnitude of the problem can be appreciated when it is realized that some growers produce and harvest millions of carnations per year as well as any other flowers susceptible to the same problem. Prior to the present invention, the growers of such flowers had the alternatives of incurring excessive costs in protecting the buds against splitting or avoiding such costs and incurring excessive loss due to bud rupture and consequent culling.

SUMMARY OF THE INVENTION

In view of the foregoing factors and conditions characteristic of apparatus and methods for preventing premature sepal separation on floral buds, it is a primary object of the present invention to provide a new and useful apparatus and a method for preventing premature sepal separation on floral buds not subject to the difficulties enumerated above.

Another object is to provide a sepal constraining apparatus which is quick and easy to install.

Another object is to provide a sepal-constraining apparatus which when rested on a flower bud automatically exerts the desired degree of constraint on the sepals thereof.

Another object is to provide such an apparatus that can automatically accommodate buds of a wide range of sizes.

Another object is to provide an improved method for preventing premature sepal separation on floral buds which substantially reduces the labor previously required for the purpose.

According to one aspect of the present invention, a new and useful apparatus is provided for preventing premature separation of the sepals on a flower bud when its corolla is stimulated into faster growth than its calyx. This apparatus includes a cap having an encompassing conical sidewall adapted automatically to descend to a desired point of constriction when the cap is dropped onto the bud.

Another object is to provide such an apparatus which is ventilated.

Another object is to provide such a ventilated apparatus which provides a barrier to thrip infestation and the like.

Another object is to provide a sepal constraining apparatus which admits fog, water and insecticide spray, and insures ventilation to minimize undesirable condensation.

Another object is to provide such an apparatus which can be compactly nested for storage and transportation.

Another object is to provide such an apparatus that can be installed and removed with a minimum of labor.

Another object is to provide such an apparatus which is re-usable.

According to the method of the present invention, a stack of caps can be compactly stored in a flower-growing area for convenient access. A stack can conveniently be carried by a workman who removes individual caps from the stack, drops the open ends of the caps over buds and moves previously positioned caps from previous buds to new buds when the corolla on the previous buds start to bloom. The caps have depending tabs which facilitate guiding the open ends of the caps over the buds. Additionally, the depending tabs can be used for quickly and easily separating individual caps from the stack. Alternatively, the caps can be removed from the stack by grasping the pointed tips on the caps as will all become more clearly apparent in the subsequent description in the specification.

DESCRIPTION OF THE FIRST FORM

Figure 1:
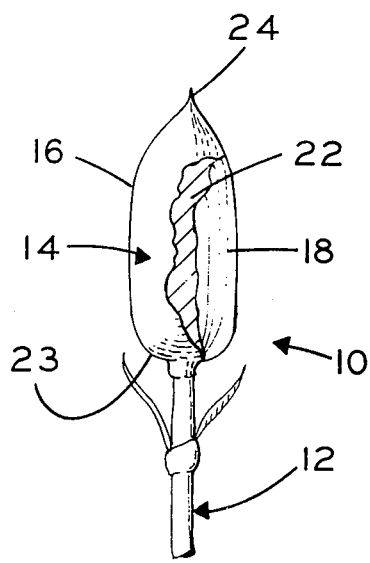
FIG. 1 is a side elevation of a carnation flower bud having parts broken away to show internal construction.
Figure 2:
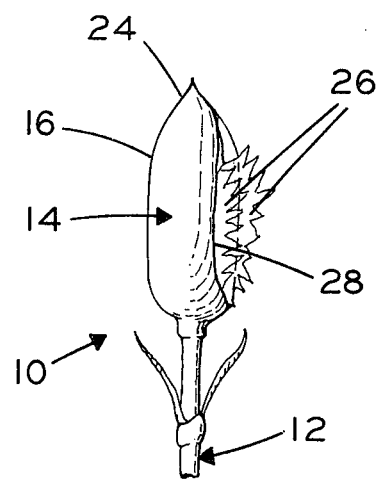
FIG. 2 is a side elevation of a bud in which the corolla has ruptured through the calyx.
Figure 3:
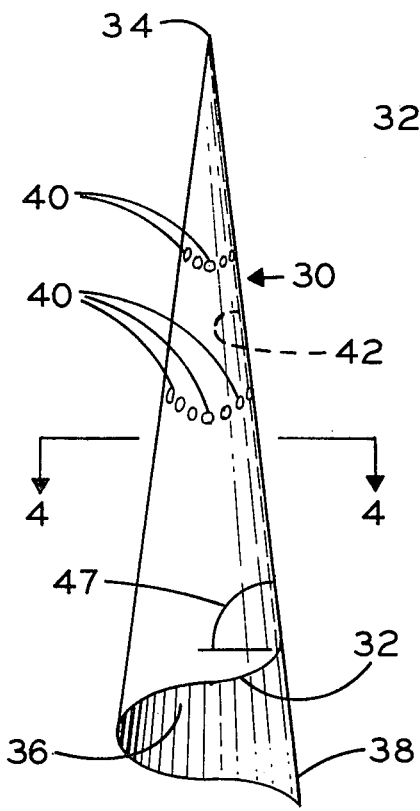
FIG. 3 is a side elevation of a cap embodying the principles of the present invention which may be placed on the bud of FIG. 1 to prevent the calyx from rupturing because of expansion of the corolla.
Figure 4:
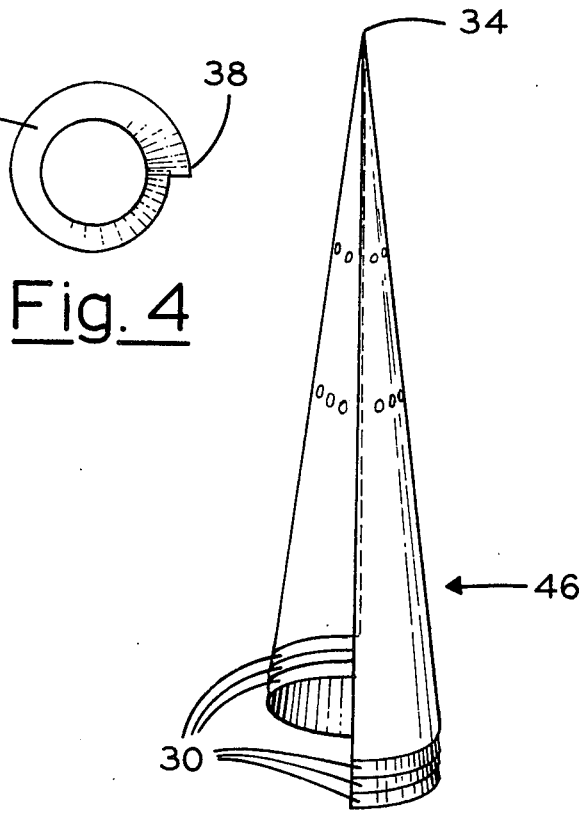
FIG. 4 is a section taken on line 4—4 of FIG. 3.

Referring in greater detail to the drawings and more particularly to FIGS. 1 and 2, a carnation 10 has a stem 12 bearing a bud 14. The bud 14 has a calyx 16 which is the external covering of the bud and which includes a plurality of sepals 18 forming a protective envelope for the petals or corolla 22.

The calyx 16 has a closed bottom portion 23 and a top portion 24 which is also closed initially; however, under normal growing conditions, the sepals ultimately separate at top portion 24 so that the individual petals 26 forming corolla 22 can emerge and unfold when carnation 10 blooms.

Under certain conditions, like sudden temperature and humidity changes, the corolla 22 is stimulated into an uneven or unduly vigorous growth and may exert enough internal pressure to rupture calyx 16 forming a crack 28. Once the calyx cracks, the petals 26 emerge and if the crack is on one side of the bud, the flower is lop sided. This results in a cull which usually cannot be sold. The apparatus and method of the present invention prevents calyx sidewalls from such cracking.

The apparatus is a conical cap 30 having an encompassing sidewall 32, an apical top 34 and an open bottom 36 from which a tab 38 depends. The cap 30 is preferably made from translucent or transpanent film of polyethylene or the like. A film 4 mil thick has been found to be satisfactory. The sidewall 32 is perforated, as indicated generally at 40, for ventilation purposes.

Figure 5:
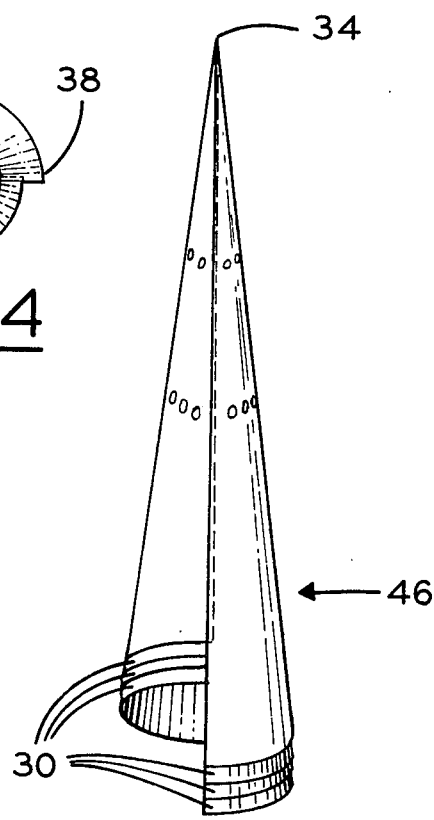
FIG. 5 is a side elevation of a stack of caps of the form shown in FIG. 3.

The cap 30 can be made from a strip of material having edges 42 which overlap and are heat-sealed together or they may be made without a seam by injection molding or other techniques which will readily manifest themselves to those skilled in the art. A plurality of caps 30 may be nested as shown in FIG. 5 to form a stack 46 from which individual caps 30 may be taken and placed over the buds 14. When used on carnation buds, suitable dimensions for the cap are 6 centimeters for the major diameter, 11¾ centimeters for the length along edge 42, 12½ centimeters in length along sidewall 32 from open bottom 36 to top 34 measured along a line lying 180° around sidewall 32 from edge 42, a 5 centimeter tab, as measured from the lower end of edge 42 to the lower end of tab 38, and an angle 47 of 80° to 85°. The walls of the cone preferably converge at approximately 15°. Expressed differently, the walls converge at from 5° to 10° relative to the longitudinal axis of the cone or from 10° to 20° relative to each other. These dimensions are given for purposes of illustration, but not of limitation. Other dimensions will produce satisfactory results so long as the upper end of the cap is of substantially less girth than the bud and the lower end of the cap is of greater girth.

Figure 6:
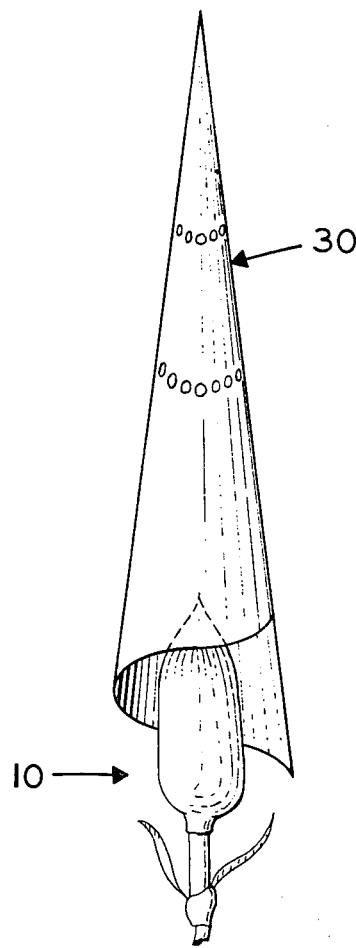
FIG. 6 is a side elevation of the cap of FIG. 3 being positioned over the bud of FIG. 1.
Figure 7:
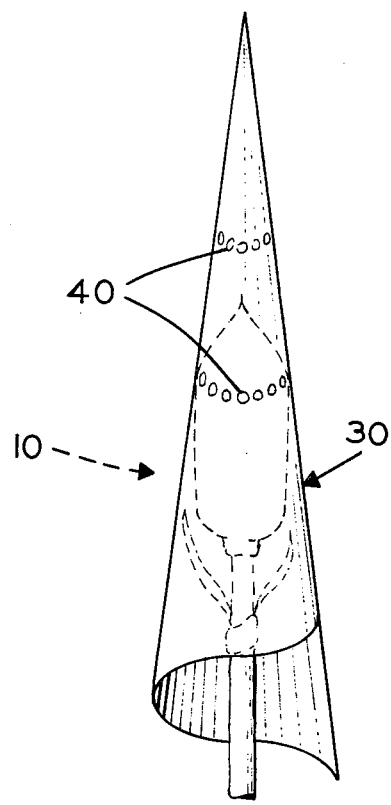
FIG. 7 is a side elevation similar to FIG. 6 but showing the cap after it as automatically descended to a desired point of constriction on the bud.
Figure 8:
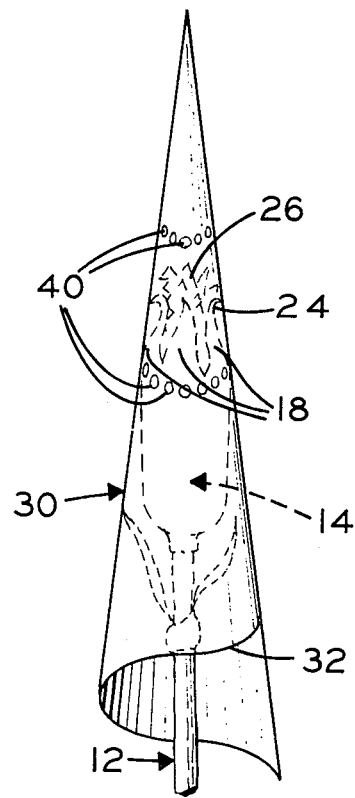
FIG. 8 is a side elevation of a cap and bud assembly showing the corolla emerging from the top of the bud.

When cap 30 is positioned over bud 14 as shown in FIG. 6 and then released, the cap automatically descends to a desired point of constriction as shown in FIGS. 7 and 8, where sidewall 32 reinforces calyx 16 an optimum amount so that a crack 28 will not form when corolla 22 is stimulated into an uneven or excessive growth and the calyx 16 will not be constricted enough to interfere with normal bud growth. Caps 30 may be removed when the top portion 24 of calyx 16 opens and petals 26 emerge, as shown in FIG. 8. Thus, one aspect of the method of the present invention resides in the steps of placing a cap on a calyx so that the encompassing sidewall of the cap will automatically descend to a desired point of constriction on the calyx and of removing the cap when the corolla 22 starts to bloom.

According to another aspect of the method of the present invention, a stack 46 of caps 30 may be provided in a flower-growing area. Individual caps 30 may be removed from the stack and dropped onto each fully-developed bud in the growing area. The caps may then be shifted from blooming buds to newly developing buds in the growing area.

DESCRIPTION OF THE SECOND FORM

Figure 9:
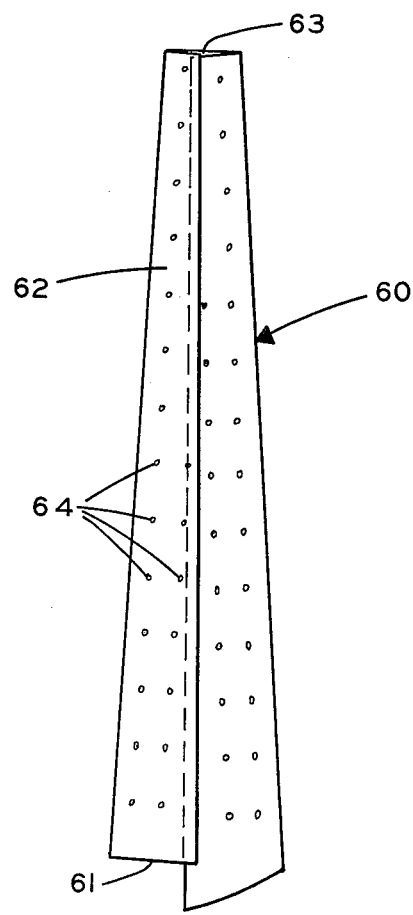
FIG. 9 is a side elevation of a modified form of the present invention.
Figure 10:
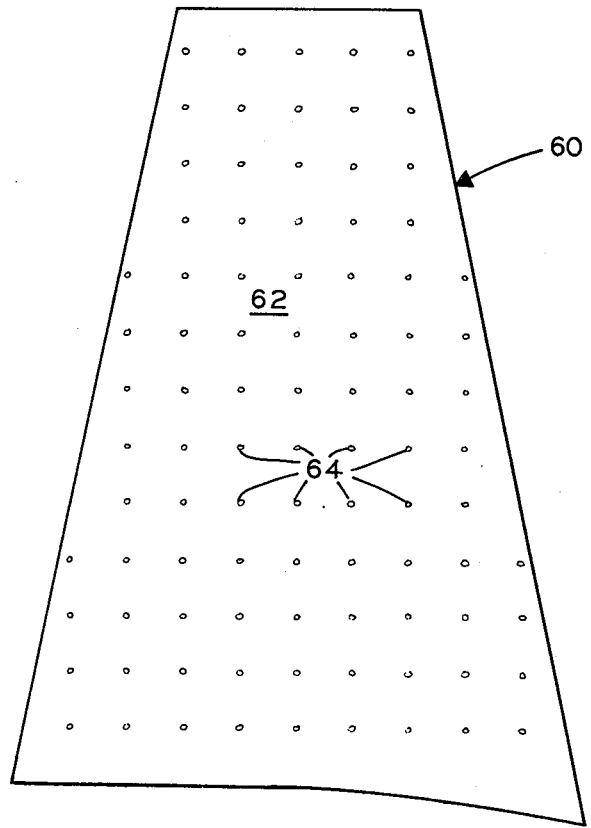
FIG. 10 is a plan view of the form of the invention of FIG. 9 severed longitudinally and flattened to planar configuration for illustrative convenience.

A second form of the present invention is shown in FIGS. 9 and 10. The apparatus provides a frusto-conical cap 60 of translucent or transparent film of polyethylene or the like. It provides an open bottom 61 adapted to receive the buds of carnations and the like, an upwardly constricted sidewall 62 and an open top 63, too small to pass over such a bud. The sidewall is perforated at 64 in substantially equally spaced relation throughout. The perforations are conveniently arranged in longitudinally and transversely spaced rows approximately one centimeter apart. Where thrips are present, the perforations are preferably small enough to preclude thrip entrance therethrough. Perforations one millimeter in diameter are suitable for the purpose.

The apparatus of the second form of the invention can be stacked for storage or transport in the same manner as the first form, as shown in FIG. 5.

In use, the second form is placed over the flower buds 10, as shown in FIGS. 6 and 7, and functions in the same general manner with certain advantages. Ventilating air can pass inwardly through the perforations 64 and out the upper end 63 to minimize undesirable condensation. Air can also pass inwardly through the lower end 61 for exhaust through the upper end 63 with the apparatus having a stack effect also to minimize undesirable condensation. While the perforations 64 admit and emit air, they are small enough to exclude thrips and similar pests. Water, insecticide, and fungicide can be sprayed or fogged downwardly through the open upper end 63 and insecticide and fungicide dusts can likewise be dusted downwardly therethrough.

Most important, however, the second form of the present invention is also thoroughly effective in precluding or minimizing premature and eccentric bud opening, is easy to install and remove and is thoroughly effective in performing its intended functions.

Although the invention has been shown and described in what are conceived to be the most practical and preferred methods and apparatus, it is recognized that departures may be made therefrom within the scope of the invention, which is not to be limited to the illustrative details disclosed.

Having described my invention, what I claim as new and desire to secure by Letters Patent is:

1. An apparatus for preventing premature and uneven separation of the sepals of flower buds comprising a hollow substantially conical cap of light transmitting material adapted to rest downwardly over a flower bud in circumscribing relation to the sepals thereof, said cap having a longitudinal axis and a side wall which converges at an angle of from approximately 5° to 10° with the axis.

2. The apparatus of claim 1 in which the conical cap has an angle of approximately 15°.

3. The apparatus of claim 1 in which the cap is perforated for ventilation purposes.

4. The apparatus of claim 1 in which the cap has an apical end, and an open opposite end terminating in a spiral edge defining a handling tab.

5. An apparatus for minimizing the premature and/or uneven rupture of the calyx of the buds of carnations and the like comprising a hollow acutely conical cap of flexible, light transmitting sheet material having a side wall providing diametrical portions which converge at an angle of approximately 15° adapted to rest downwardly over such a bud in circumscribing engagement with the calyx thereof.

6. An apparatus for minimizing the premature and/or uneven rupture of the calyx of the buds of carnations and the like comprising a hollow substantially frusto conical cap of flexible light transmitting sheet material having a side wall providing diametrically opposite portions which converge at an angle of from approximately 10° to 20° adapted to rest downwardly over such a bud in circumscribing engagement with the calyx thereof.

7. The apparatus of claim 6 in which the cap has opposite open axial ends.

8. A method of minimizing premature and/or uneven rupture of the buds of carnations and the like having a corolla encapsulated in a calyx providing endwardly extended sepals comprising resting a substantially conical cap having side walls which converge upwardly at an angle of from approximately 10° to 20° downwardly over the calyx of such a bud prior to its rupture whereby the cap engages the calyx in circumscribing relation thereto in spaced relation to the extended ends of the sepals and exerts a constricting force on the calyx in opposition to the expanding force of the corolla within the calyx, and removing the cap from the bud when the corolla has expanded sufficiently to cause the extended ends of the sepals to commence separation.

9. A method of minimizing premature and/or asymetrical rupture of the buds of carnations and the like having a corolla encapsulated in a calyx which provides endwardly extended sepals comprising applying a constraining force to such a bud in circumscribing relation to the calyx thereof in spaced relation to the extended ends of the sepals by resting a cap thereon having side walls which upwardly converge at an angle of from approximately 10° to 20°, admitting light and ventilation to the bud while maintaining said constraining force, and releasing said constraining force when the sepals commence to separate at their extended ends.

10. An apparatus for minimizing the premature and/or uneven rupture of the buds of carnations and the like comprising a hollow acutely conical cap of flexible, light transmitting sheet material having a longitudinal axis, and a side wall which converges with the axis at an angle of from approximately 5° to 10° adapted to rest downwardly over such a bud in circumscribing engagement therewith.

11. The apparatus of claim 10 in which the cap has a bottom opening and an opening upwardly thereof for the passage of ventilating air therethrough.

* * * * *

UNITED STATES PATENT AND TRADEMARK OFFICE
CERTIFICATE OF CORRECTION

PATENT NO. : 3,987,583
DATED : October 26, 1976
INVENTOR(S) : George Takeyasu

It is certified that error appears in the above—identified patent and that said Letters Patent are hereby corrected as shown below:

Column 3, line 2, delete "as" and substitute ---has---.

Signed and Sealed this

Fifteenth Day of February 1977

[SEAL]

Attest:

RUTH C. MASON
*Attesting Officer*

C. MARSHALL DANN
*Commissioner of Patents and Trademarks*